W. J. DUNHAM & E. W. PECK.
POTATO DIGGER AND SEPARATOR.
APPLICATION FILED JAN. 25, 1910.
983,694.
Patented Feb. 7, 1911.
2 SHEETS—SHEET 2.
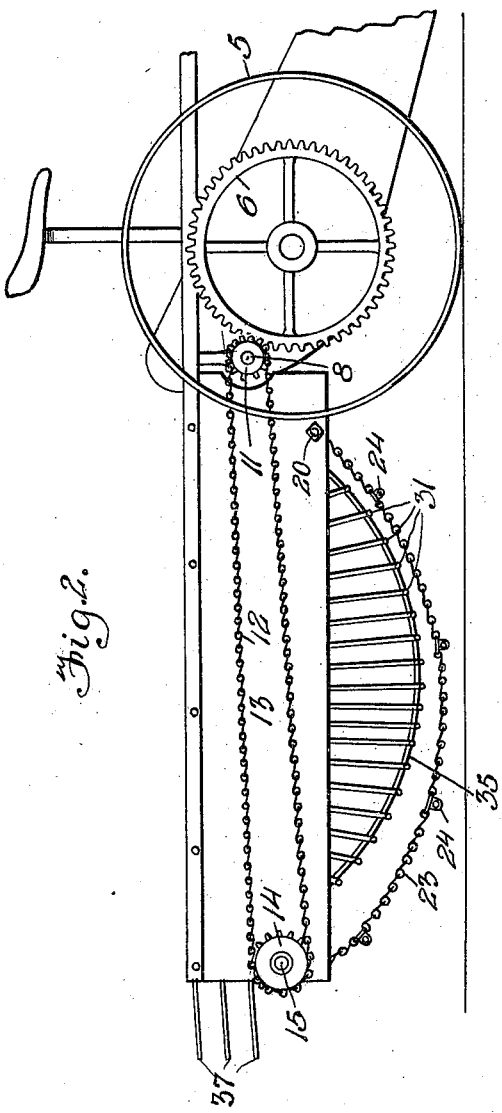
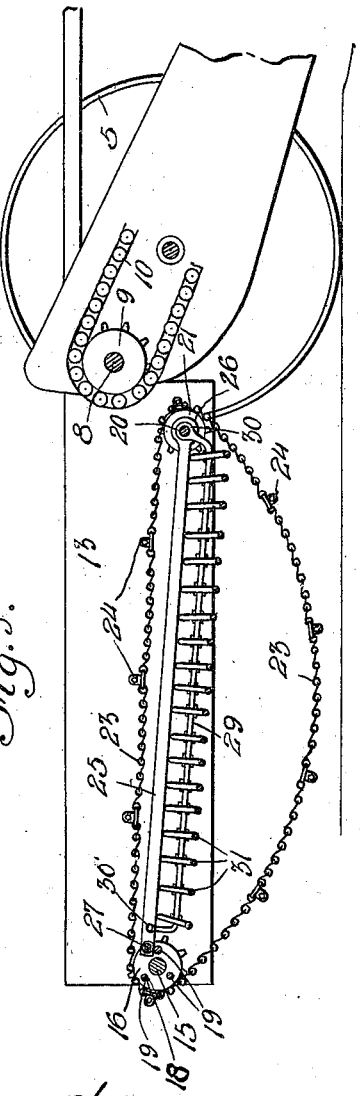

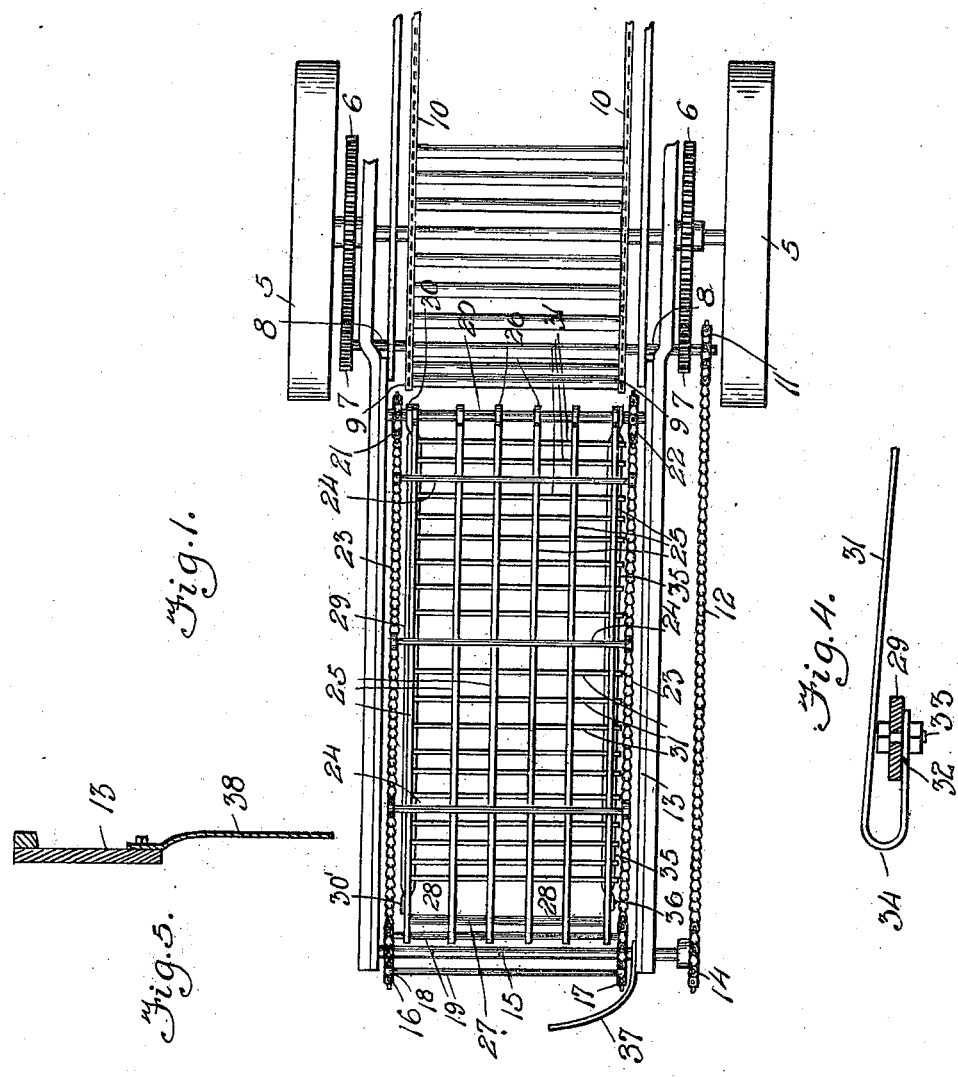

UNITED STATES PATENT OFFICE.

WILLIAM J. DUNHAM AND EUGENE W. PECK, OF GLOVERSVILLE, NEW YORK.

POTATO DIGGER AND SEPARATOR.

983,694. Specification of Letters Patent. Patented Feb. 7, 1911.

Application filed January 25, 1910. Serial No. 539,923.

*To all whom it may concern:*

Be it known that we, WILLIAM J. DUNHAM and EUGENE W. PECK, citizens of the United States of America, and residents of Gloversville, in the county of Fulton and State of New York, have invented certain new and useful Improvements in Potato Diggers and Separators, of which the following is a specification.

This invention relates to harrows and diggers and particularly to a class thereunder known as potato diggers and separators.

An object of this invention is to produce novel means for separating vines, earth and potatoes from one another, means being provided for disposing of the vines by conveying them to the rear of the apparatus and for discharging them and other novel means being provided for separating the potatoes and earth from each other after they have been freed from the vines.

A further object of this invention is to provide a separating device to be operated in conjunction with an excavating and conveying apparatus, the said separating device preferably comprising a vibratory screen forming a chute for discharging the potatoes to the side of the machine, means being furthermore provided for confining or limiting the movement of the potatoes in their discharge from the screen whereby they are collected in what might be termed a windrow as the machine advances.

A still further object of this invention is to produce novel means for directing the vines and weeds toward the rear of the machine and at the same time agitating the said means to effectually separate the earth and potatoes therefrom, means being provided whereby the several parts of the apparatus are driven from the traction wheel of the excavator.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1 illustrates a top plan view of a fragment of an excavator embodying the invention; Fig. 2 illustrates a side elevation of the device shown in Fig. 1; Fig. 3 illustrates a longitudinal vertical sectional view thereof; Fig. 4 illustrates a detail view of one of the screen fingers and its connection with a bracket; and Fig. 5 illustrates a detail view of the deflector.

In these drawings 5, indicates the traction wheels of an ordinary excavator and conveyer. The traction wheel is mounted to communicate motion to the gear wheels 6, which gear wheels mesh with pinions 7, mounted on the shaft 8. The shaft 8 in turn has sprocket wheels 9 thereon which are engaged by the elevator chain 10. The shaft 8 is provided further with a sprocket wheel 11 which is engaged by a sprocket chain 12 running to the rear of the separator frame 13 where it engages a sprocket wheel 14 mounted on a shaft 15 journaled in the sides of the separator frame.

The shaft 15 is provided with two sprocket wheels 16 and 17 intermediate the two sides of the separator frame and each of said sprocket wheels 16 is provided with apertures 18, in which are seated the ends of rods 19. A shaft 20 extends through the sides of the separator near the forward end thereof and it has mounted thereon two idlers 21 and 22 over which the sprocket chains 23 are run. The chains 23, one of which is provided at each side of the separator frame are connected by a series of bars 24 which form conveyers for engaging vines and weeds for the purpose of carrying them rearwardly of the separator, it being apparent from an inspection of Figs. 2 and 3 that the conveyer from the excavator discharges to the conveyer just described formed by the sprocket chains 23 and the crossbars 24.

A grid is mounted between the sides of the separator frame and the said grid comprises a series of longitudinally disposed bars 25 having eyes 26 formed in their inner ends which receive the shaft 20 whereas the outer ends of said bars 25 are connected by a rod 27, the said bars 25 being spaced apart on the rod 27 by means of the sleeves or collars 28. As shown in the drawings, Fig. 3, the rods 19 which extend between the sprocket wheels 16 and 17 are carried around as the said sprocket wheels are rotated and it is the purpose of the inventors to have the ends of the bars 25 forming the grid terminating in the path of travel of the rods 19 in order that the said rods will be elevated to a slight degree and released as the sprocket wheels rotate for by such an arrangement the grid is vibrated slightly and the vines earth and potatoes are agitated to such an extent as to result in the separation and a discharge of the earth and potatoes into the sifter or screen (to be presently explained).

A bracket 29 is provided at one side of the separator and it comprises a longitudinally disposed member having an eye 30 at one end which receives the shaft 20 so that the said bracket is pivoted and allowed a slight oscillatory movement whereas the outer end of said bracket is bent upwardly and secured to one of the bars 25 as shown at 30'. The means of securing the bracket to the bar is an immaterial detail but a bolt or other fastening means may be employed.

A series of spring fingers 31 is secured to the bracket 29 and the preferred construction of these fingers is shown in the drawings as comprising strips of material each having one end bent to form an eye 32 resting against the bracket 29 and secured thereto by a bolt 33. Each finger is bent in a goose neck curve 34 which allows sufficient spring action to cause agitation of material falling on the fingers which action is augmented by the vibratory movement of the grid through the action of the rods on the sprocket wheels 16 and 17. The fingers extend downwardly transversely of the separator and terminate a suitable distance below the lower edge of the sides of the separator frame and they are supported by a stirrup 35 which has one of its ends suspended from the shaft 30 and its opposite end suspended from one of the bars 25, the said stirrup being connected to one of the bars 25 by a bolt 36. The pitch or incline of the fingers transversely of the separator will be determined by the length of the stirrup and it may be variously modified to suit particular requirements.

Projecting from the end of the frame, we provide a series of deflector arms 37 which have their ends anchored on the side of the separator frame and extend rearwardly and inwardly toward the transverse center of the separator frame and act as deflectors for directing the vines which are discharged from the rear of the separator to such an extent as to preclude their being deposited on the windrows of potatoes which have been discharged from the screen. We also provide a deflector or hood 38 which depends from one side of the separator frame and guards the discharge from the screen in order that potatoes may be directed downwardly to the ground in a windrow.

We claim—

1. In a separator, a frame, shafts mounted therein, a grid on one of the shafts, a conveyer operating over the said grid, means on the other shaft for oscillating the grid, means on the grid for supporting a screen, screen fingers anchored thereto, and a support suspended from the grid for supporting the free ends of the spring fingers.

2. In a separator, shafts rotatably mounted, a grid on one of the shafts, means on the other shaft for oscillating the grid, a bracket supported from the shaft and grid, spring fingers anchored to the said bracket, and a stirrup suspended from the shaft and grid for supporting the free ends of the spring fingers.

3. In a separator, shafts rotatably mounted, a grid on one of the shafts, means on the other shaft for oscillating the grid, a bracket suspended below the grid, spring fingers anchored to the bracket, and a stirrup suspended below the grid occupying a plane lower than the bracket for supporting the free ends of the spring fingers.

4. In a separator, a frame, shafts mounted therein, a grid mounted on one of the shafts, means on the other shaft adapted to oscillate the grid, and a screen suspended from the grid and taking motion therefrom.

5. In a separator, a frame, shafts mounted therein, a grid mounted on one of the shafts, means on the other shaft adapted to oscillate the grid, a screen suspended from the grid and taking motion therefrom, and a deflector secured to the frame and extending into operative relation with the ends of the screen.

6. In a potato separator, a frame, shafts therein, means for rotating one of the shafts, a grid mounted to oscillate on the other shaft, means whereby the movement of one shaft is communicated to the grid, a screen comprising spring fingers suspended from the grid and a deflector operating in conjunction with the screen.

In testimony whereof, we have hereunto affixed our signatures in the presence of two witnesses.

WILLIAM J. DUNHAM.
EUGENE W. PECK.

Witnesses:
J. Frank Davis,
J. E. Belden.